United States Patent
Park et al.

(10) Patent No.: US 11,688,050 B2
(45) Date of Patent: Jun. 27, 2023

(54) WAFER MAP ANALYZER, METHOD FOR ANALYZING WAFER MAP USING THE SAME AND METHOD FOR MANUFACTURING SEMICONDUCTOR DEVICE

(71) Applicant: SAMSUNG ELECTRONICS CO., LTD., Suwon-si (KR)

(72) Inventors: Min Chul Park, Hwaseong-si (KR); Jeong Hoon Ko, Hwaseong-si (KR); Ji Yong Park, Suwon-si (KR); Je Hyun Lee, Suwon-si (KR); Dae Sin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 15/960,701

(22) Filed: Apr. 24, 2018

(65) Prior Publication Data
US 2019/0050979 A1 Feb. 14, 2019

(30) Foreign Application Priority Data
Aug. 11, 2017 (KR) .................. 10-2017-0102035

(51) Int. Cl.
*G06T 7/00* (2017.01)
*G06V 10/762* (2022.01)
(Continued)

(52) U.S. Cl.
CPC ............ *G06T 7/0004* (2013.01); *G06F 18/23* (2023.01); *G06F 18/24* (2023.01);
(Continued)

(58) Field of Classification Search
CPC ......... G06T 7/0004; G06T 2207/20084; G06T 2207/20081; G06T 2207/30148;
(Continued)

(56) References Cited

U.S. PATENT DOCUMENTS 5,787,190 A * 7/1998 Peng ................... H01L 22/20
438/10
7,813,539 B2 10/2010 Shibuya et al.
(Continued)

FOREIGN PATENT DOCUMENTS

KR 1020050030346 A 3/2005
KR 20070070903 A * 7/2007 ........... G06T 7/0004
(Continued)

OTHER PUBLICATIONS

Ming-Ju Wu et al., "Wafer Map Failure Pattern Recognition and Similarity Ranking for Large-Scale Data Sets," IEEE Transactions On Semiconductor Manufacturing, vol. 28, No. 1, Feb. 2015.
(Continued)

*Primary Examiner* — John W Lee
(74) *Attorney, Agent, or Firm* — Volentine, Whitt & Francos, PLLC

(57) ABSTRACT

A method for analyzing a wafer map using a wafer map analyzer includes generating first wafer maps each displaying characteristics of a first wafer for a corresponding channel of a plurality of channels. The first wafer maps are auto-encoded together to extract a first feature. The method also includes determining whether the first feature is a valid pattern, classifying the type of the first feature based on unsupervised learning when the first feature is a valid pattern and extracting a representative image of features classified into the same type as the first feature.

7 Claims, 11 Drawing Sheets

(51) Int. Cl.
  *G06V 10/764* (2022.01)
  *H01L 21/66* (2006.01)
  *G06F 18/23* (2023.01)
  *G06F 18/24* (2023.01)
  *G06F 18/2413* (2023.01)

(52) U.S. Cl.
  CPC ...... *G06F 18/24137* (2023.01); *G06V 10/762* (2022.01); *G06V 10/764* (2022.01); *G06T 2207/20081* (2013.01); *G06T 2207/20084* (2013.01); *G06T 2207/30148* (2013.01); *G06V 2201/06* (2022.01)

(58) Field of Classification Search
  CPC .... G06T 7/001; G06K 9/6218; G06K 9/6272; G06K 9/6267; G06K 2209/19; G06K 9/6259; H01L 22/12
  See application file for complete search history.

(56) References Cited

U.S. PATENT DOCUMENTS

| | | | |
|---|---|---|---|
| 7,937,234 B2 | 5/2011 | St. Pierre et al. | |
| 8,010,468 B2 | 8/2011 | Tsai | |
| 8,627,266 B2 | 1/2014 | Lee et al. | |
| 2004/0064269 A1* | 4/2004 | Shibuya | G06T 7/0004 702/40 |
| 2007/0211932 A1 | 9/2007 | Lee et al. | |
| 2008/0301073 A1* | 12/2008 | Tsai | G06N 3/02 706/19 |
| 2013/0045545 A1* | 2/2013 | Lee | H01L 22/20 257/E21.525 |
| 2014/0303912 A1 | 10/2014 | Banerjee et al. | |
| 2017/0192411 A1* | 7/2017 | Ghadar | G06N 20/00 |

FOREIGN PATENT DOCUMENTS

| KR | 1020070070903 A | 7/2007 |
| KR | 20090070235 A | 7/2009 |
| KR | 1542558 B1 | 8/2015 |

OTHER PUBLICATIONS

Korean Office Action dated Jan. 28, 2022, Cited in Corresponding Korean Application No. KR 10-2017-0102035.

* cited by examiner

WAFER MAP ANALYZER, METHOD FOR ANALYZING WAFER MAP USING THE SAME AND METHOD FOR MANUFACTURING SEMICONDUCTOR DEVICE

This U.S. non-provisional patent application claims the benefit of priority under 35 U.S.C. 119 to Korean Patent Application No. 10-2017-0102035, filed on Aug. 11, 2017 in the Korean Intellectual Property Office, the disclosure of which is incorporated herein by reference in its entirety.

BACKGROUND

1. Field

The present disclosure relates to a wafer map analyzer, a method for analyzing the wafer map using the same, and a method for manufacturing a semiconductor device.

2. Description of the Related Art

In a manufacturing process of a semiconductor device, data of all wafers may be collected in the form of a map of the wafer (a wafer map) because of its nature. Since the patterns of the wafer maps relate to (are connected with) a specific process and a specific facility, various types of analysis may be performed. The reason is that it is possible to detect defects of a specific process or specific facility through characteristics of the wafer map. Therefore, recently, pattern analysis of such a wafer map has been recognized as a method capable of reducing defects and improving the yield in the manufacturing process of the semiconductor device.

However, at present, analysis of the wafer map depends on manual analysis of engineers in the field of visual recognition, and a percentage of manpower input is very high. Thus, there is a tendency that personnel expenses are high and accuracy is low.

Therefore, through the method for analyzing the wafer map by machine learning, the cost of the semiconductor manufacturing process can be greatly reduced and the yield can be greatly improved with increased accuracy.

SUMMARY OF THE INVENTION

An aspect of the present disclosure provides a method for analyzing a wafer map which reduces cost and increases accuracy.

Another aspect of the present disclosure provides a wafer map analyzer which reduces cost and increases accuracy.

Still another aspect of the present disclosure provides a method for manufacturing a semiconductor device which reduces cost and increases accuracy.

The aspects of the present invention are not limited to those mentioned above and another aspect which has not been mentioned can be clearly understood by those skilled in the art from the description below.

According to an aspect of the present disclosure, a method for analyzing a wafer map includes generating a first wafer map displaying characteristics of a first wafer for each of multiple channels. The method also includes auto-encoding the first wafer maps of the multiple channels together to extract a first feature, determining whether the first feature is a valid pattern, classifying a type of the first feature based on unsupervised learning when the first feature is a valid pattern, and extracting a representative image of features classified into the same type as the first feature.

According to another aspect of the present disclosure, a method for analyzing a wafer map includes generating a first wafer map of a first channel of a first wafer, and a second wafer map of a second channel of the first wafer. The method also includes generating a third wafer map of a first channel of a second wafer, and a fourth wafer map of a second channel of the second wafer. The method further includes auto-encoding the first wafer map and second wafer map together to extract a first feature of the first wafer, auto-encoding the third wafer map and fourth wafer map together to extract a second feature of the second wafer, generating a feature group including the first feature and the second feature, excluding invalid features among the features of the feature group from the feature group, clustering the feature group into multiple types based on unsupervised learning, and extracting representative images of the multiple types, respectively.

According to still another aspect of the present disclosure, a method for analyzing a wafer map includes forming multiple wafer maps for multiple wafers, respectively. The method also includes auto-encoding the multiple wafer maps to extract multiple features corresponding to the multiple wafers, excluding invalid features among the multiple features, classifying valid features among the multiple features into multiple types using unsupervised learning, generating multiple center features corresponding to respective centers of the multiple types, and reconstructing the multiple center features to output a representative image.

According to an aspect of the present disclosure, a wafer map analyzer includes a storage device and a processor. The storage device stores a wafer map. The processor is connected to the storage device and executes instructions to perform a process. The processor extracts features from the wafer map, determines validity of the features, clusters the features to classify the features into multiple types, generates a feature having a center value for each of multiple classified types, and reconstructs the feature into a wafer map to generate a representative image of the type. The storage device stores the representative image for each type.

According to still another aspect of the present disclosure, a method for manufacturing a semiconductor device includes manufacturing a first wafer, and forming each of multiple first wafer maps for multiple first wafers. The method also includes auto-encoding the multiple first wafer maps to extract multiple features corresponding to the multiple first wafers, classifying the multiple features into multiple types, using unsupervised learning, generating multiple center features corresponding to each center of the multiple types, reconstructing the multiple center features to output a representative image, assigning a code to the representative image and storing the code in the storage device, manufacturing a second wafer in a semiconductor manufacturing facility, generating a second wafer map of the second wafer, and comparing the representative image with the second wafer map to detect defects of the semiconductor manufacturing facility.

According to another aspect of the present disclosure, a wafer map analyzer includes a non-volatile memory, a volatile memory, a processor, and a bus. The non-volatile memory stores a wafer map and program. The program is loaded to the volatile memory. The processor executes the program. The bus connects the processor, the non-volatile memory and the volatile memory. The program includes different executable modules including an auto-encoder, a feature filter, a clustering machine, and a code allocator. The auto encoder automatically encodes a wafer map to extract a feature. The feature filter determines validity of the feature and excludes the feature when the feature is not valid. The clustering machine performs clustering of the feature and generates a center feature of the group according to the clustering. The code allocator allocates a code to a representative image corresponding to the center feature and stores the code in the non-volatile memory.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE INVENTION

Figure 1:
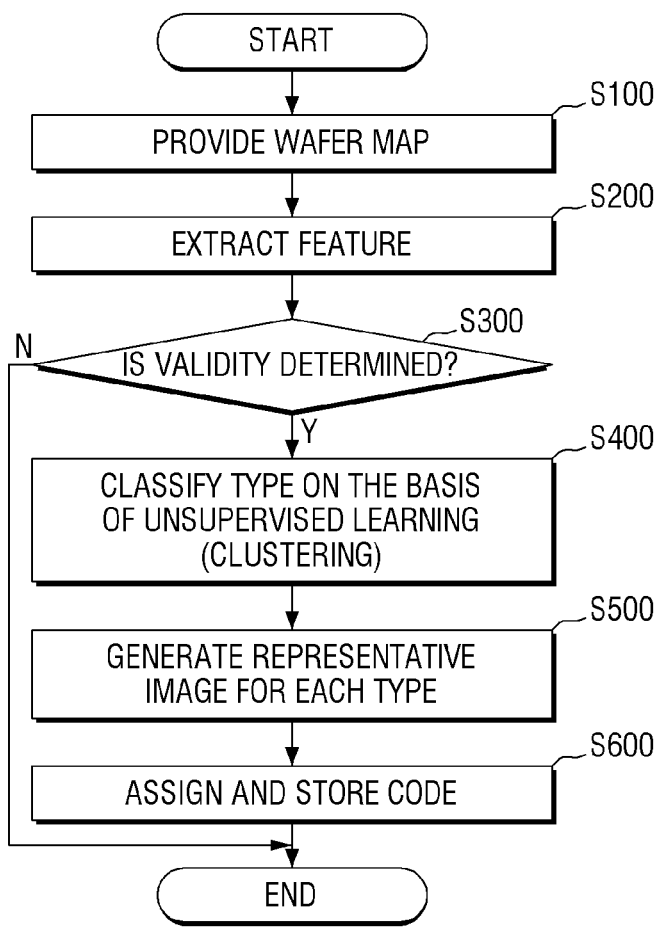
FIG. 1 is a flowchart illustrating a method for analyzing a wafer map according to some embodiments of the present disclosure.
Figure 2:
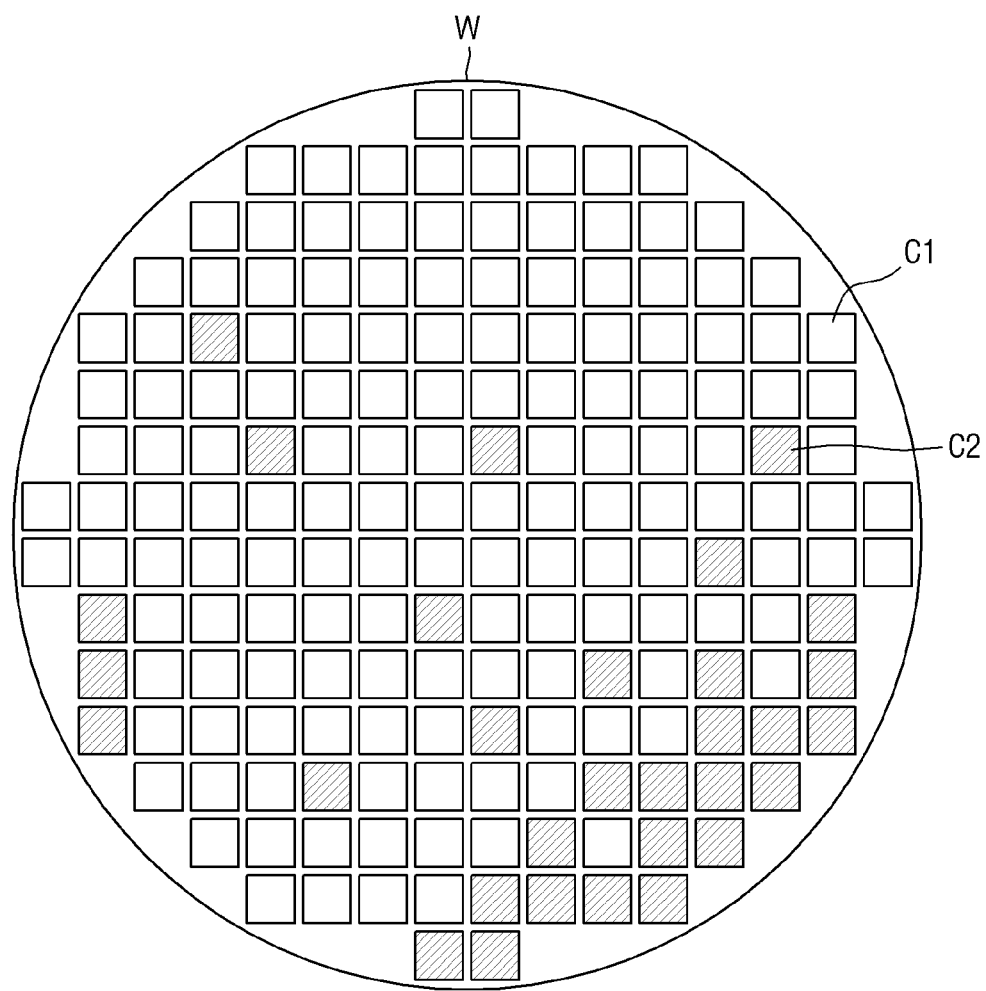
FIG. 2 is an exemplary view illustrating a wafer map for the method for analyzing the wafer map according to some embodiments of the present disclosure.
Figure 3:
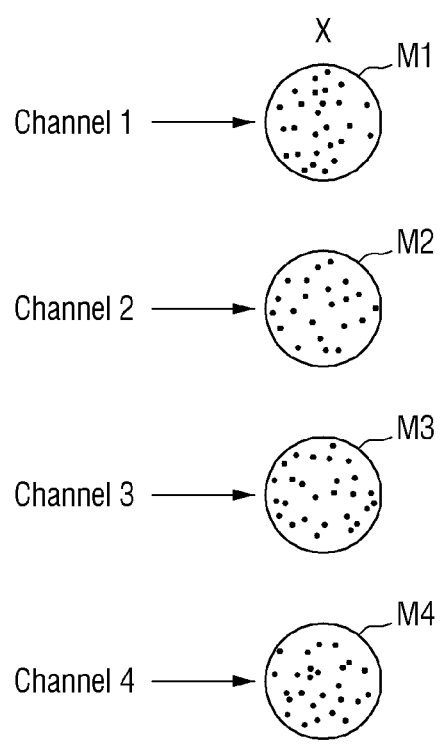
FIG. 3 is an exemplary view illustrating using multiple channels for analyzing the wafer map according to some embodiments of the present disclosure.
Figure 4:
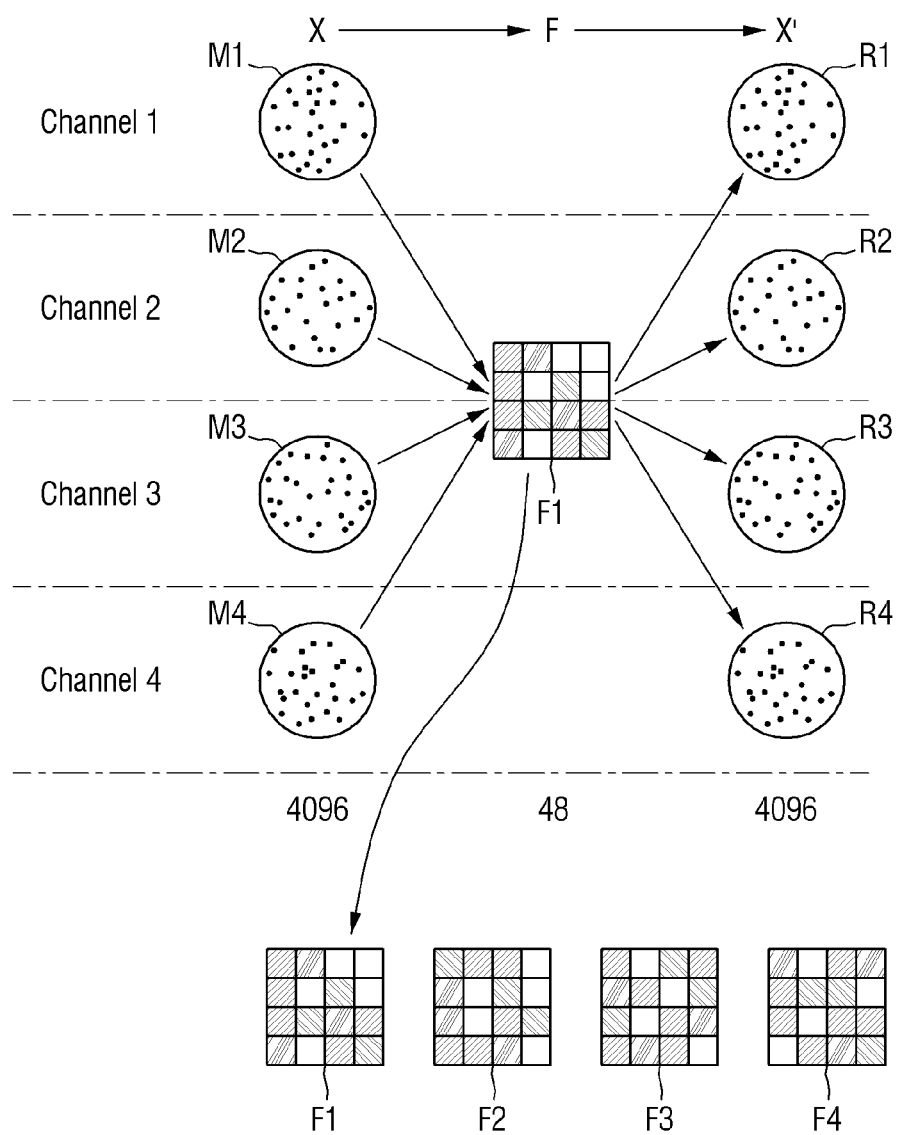
FIG. 4 is an exemplary conceptual diagram illustrating feature extraction and reconstruction of the wafer map using the multiple channels in the method for analyzing the wafer map according to some embodiments of the present disclosure.
Figure 5:
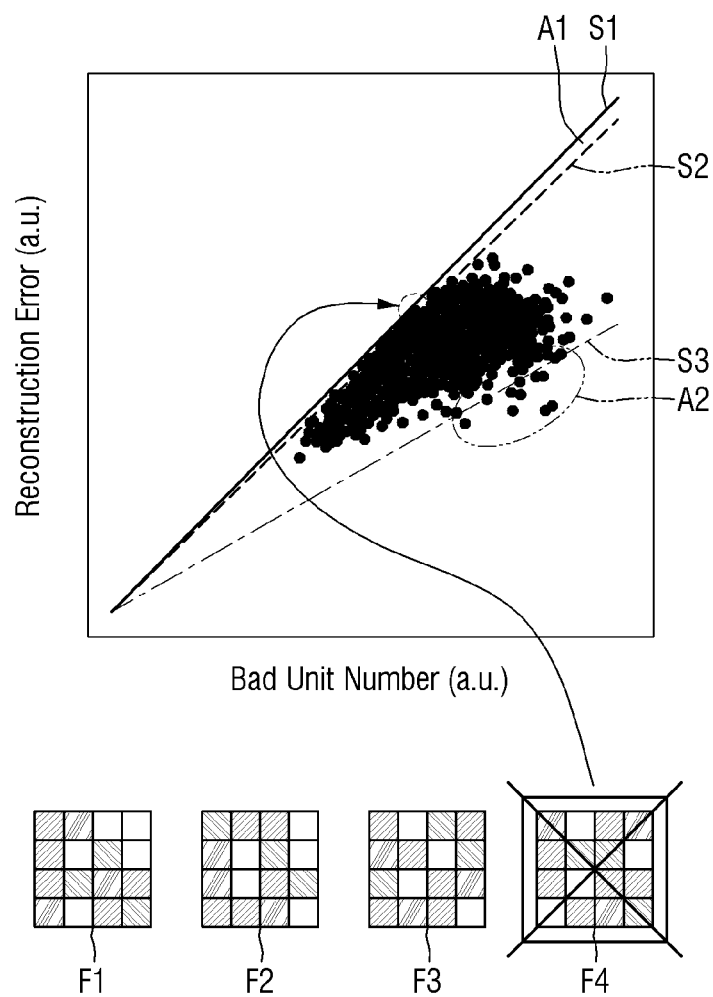
FIG. 5 is an exemplary graph illustrating validity determination of the method for analyzing the wafer map according to some embodiments of the present disclosure.
Figure 6:
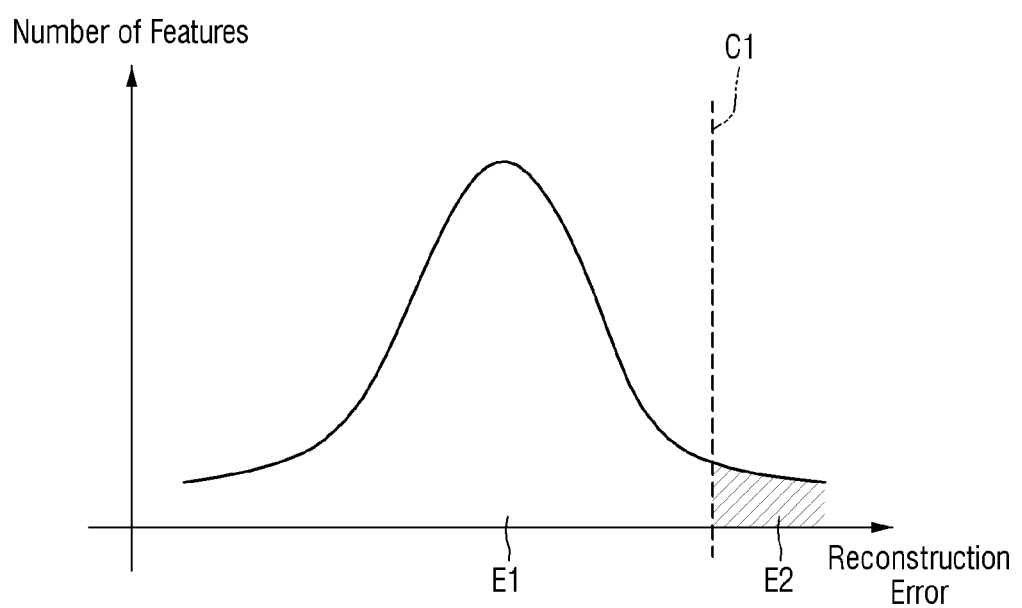
FIG. 6 is an exemplary graph illustrating validity determination of the method for analyzing the wafer map according to some embodiments of the present disclosure.
Figure 7:
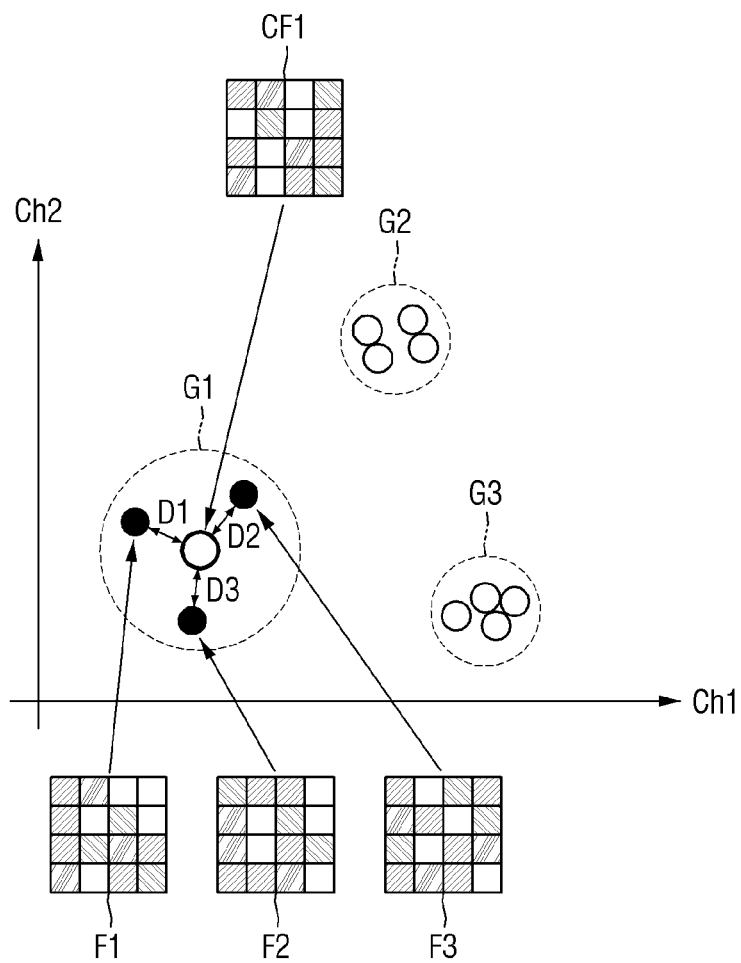
FIG. 7 is an exemplary view illustrating clustering for analyzing the wafer map according to some embodiments of the present disclosure.
Figure 8:
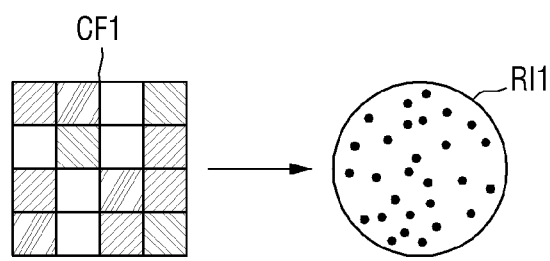
FIG. 8 is an exemplary conceptual diagram illustrating creation of a representative image for analyzing the wafer map according to some embodiments of the present disclosure.
Figure 9:
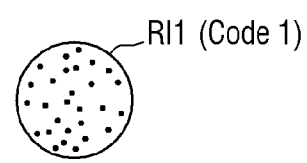
FIG. 9 is an exemplary conceptual diagram illustrating coding of a representative image for analyzing the wafer map according to some embodiments of the present disclosure.
Figure 9:
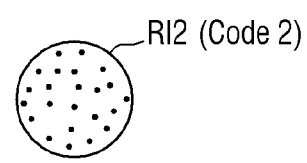
Figure 9:
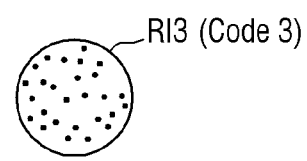

FIG. 1 is a flowchart illustrating a method for analyzing a wafer map according to some embodiments of the present disclosure. FIG. 2 is an exemplary view illustrating a wafer map for the method for analyzing the wafer map according to some embodiments of the present disclosure. FIG. 3 is an exemplary view illustrating using multiple channels for analyzing the wafer map according to some embodiments of the present disclosure. FIG. 4 is an exemplary conceptual diagram illustrating feature extraction and reconstruction of the wafer map using the multiple channels in the method for analyzing the wafer map according to some embodiments of the present disclosure. FIG. 5 is an exemplary graph illustrating validity determination of the method for analyzing the wafer map according to some embodiments of the present disclosure. FIG. 6 is an exemplary graph illustrating validity determination of the method for analyzing the wafer map according to some embodiments of the present disclosure. FIG. 7 is an exemplary view illustrating clustering for analyzing the wafer map according to some embodiments of the present disclosure. FIG. 8 is an exemplary conceptual diagram illustrating creation of a representative image for analyzing the wafer map according to some embodiments of the present disclosure. FIG. 9 is an exemplary conceptual diagram illustrating coding of a representative image for analyzing the wafer map according to some embodiments of the present disclosure First, referring to FIG. 1, a wafer map is provided (S100).

Specifically, the wafer map will be described referring to FIG. 2. The wafer W means a silicon substrate used in the process of manufacturing a semiconductor device. A semiconductor device such as a transistor is formed on the surface of the wafer W, and may be separated by the wafer W being diced into multiple chips later.

FIG. 2 illustrates a configuration in which a single wafer W is diced into units C1 and C2 like multiple chips. In a region in which one unit is formed, the characteristics of each unit may be displayed as an image.

The units C1 and C2 may be made up of individual chips, or multiple chips such as blocks of chips in sizes of 2, 4, 8, 16, 32, 64, 128, and so on. The sizes of the units C1 and C2 and the number of units C1 and C2 in the wafer W may change, depending on how many chips and the sizes of the chips used to determine the units C1 and C2. The size and number of chips by which the units C1 and C2 are determined may vary depending on how finely the characteristics in the wafer W are measured.

The wafer map may be an image mapped by displaying the characteristics for each of the units C1 and C2 in the plan view of the wafer W. The units C1 and C2 may include a good unit C1 and a bad unit C2. The good unit C1 may mean a unit with good characteristics, and the bad unit C2 may mean a unit with poor characteristics. The good unit C1 and the bad unit C2 may be expressed by different brightness, chroma, or color.

In FIG. 2, only binary values, that is good values and bad values, are expressed in the units C1 and C2, but the embodiment is not limited thereto. That is, the characteristics of the units C1 and C2 may have three or more separate grades. For example, when each of the units C1 and C2 is expressed by the first grade to fifth grade, they may be expressed by different brightness, chroma or color. Alternatively, in some embodiments of the present disclosure, they may be expressed in another way other than brightness, chroma or color.

Alternatively, in some embodiments of the present disclosure, continuous values rather than discrete values may be expressed in the units C1 and C2 of the wafer map. In such a case, the expression of brightness, chroma, color or another characteristic may also be expressed continuously for each of the units C1 and C2 of the wafer map.

Referring to FIG. 3, multiple wafer maps X may be captured or generated in or for a single wafer. That is, different wafer maps X may be generated according to the respective channels, i.e., of Channel 1 to Channel 4. A channel is typically considered a single band of frequencies used in transmissions, but as used herein may refer to processing characteristics of a single continuous space, signals used to capture the characteristics of a single continuous space, or as another reference of a mechanism to capture characteristics of an isolated and continuous portion of a single wafer W. Thus, reference to multiple different channels herein refers to mechanisms for capturing or generating multiple different wafer maps X for different, non-overlapping portions of the wafer W. Thus, the wafer maps X different from each other may be generated. Specifically, a first wafer map M1 may be captured or generated in, for or using the Channel 1, and a second wafer map M2 may be captured or generated in, for or using the Channel 2. A third wafer map M3 may be captured or generated in, for or using the Channel 3, and a fourth wafer map M4 may be captured or generated in, for or using the Channel 4.

The channels, i.e., Channel 1 to Channel 4, may also or alternatively be determined by different parameters from each other, and may therefore may be for the same, overlapping portions of the wafer W. For example, the above parameters may include performance parameters of circuitry and chip, such as conductivity, current, operating delay, and threshold voltage. Therefore, as an example, the first wafer map M1 having the conductive characteristic may be generated in, for or using the Channel 1, and the second wafer map M2 having the threshold voltage characteristic may be generated in, for or using the Channel 2. Since the respective parameters correspond to different channels, the first wafer map M1 and the second wafer map M2 correspond to the same wafer, but they may have different patterns.

Although only four channels are illustrated in FIG. 3, the present disclosure is not limited thereto. That is, channels of the method for analyzing the wafer map according to some embodiments of the present disclosure may be three or less, and may be five or more.

Referring again to FIG. 1, the features of the wafer map are extracted (S200).

Specifically, referring to FIG. 4, the wafer map X may be converted into one feature F by an auto encoder. The auto encoder is a neural network model learned so that the desired output and input become equal to each other. The auto encoder may have a neural network structure in which the input value is converted first by the encoder and the output value of the encoder is received as input by the decoder later to output the same or similar output value as the input value of the encoder.

The feature F may be obtained by compressing the information of the wafer map X and expressing the information as smaller capacity information. The feature F may be, for example, a vector format, and may be a pattern image format as illustrated in FIG. 4. For the sake of convenience, the feature F in the pattern image format will be described below.

In the method for analyzing the wafer map according to some embodiments of the present disclosure, multiple wafer maps X provided by multiple channels, i.e., Channel 1 to Channel 4, may be simultaneously auto-encoded, e.g., by a processor, in order to extract one feature F. The "auto" in the auto-encoding described herein may be taken to mean that the encoding is initiated automatically, ended automatically, performed by one or more machine components such as a processor, or other characteristics of an automated process.

That is, for example, the first wafer map M1 to fourth wafer map M4 of the first channel (Channel 1) to fourth channel (Channel 4) may be auto-encoded to extract a single first feature F1. Therefore, one feature F corresponding to one wafer may be extracted from multiple wafer maps. Accordingly, extracting a feature F from one or more wafer maps may be described as extracting the one or more wafer maps in order determine, identify, generate and/or select the feature F, and the terminology of extraction may be used in this way herein.

If the first wafer map M1 to fourth wafer map M4 each have 1024 units, information on a total of 4096 units may exist in the first wafer map M1 to fourth wafer map M4. When the wafer maps are auto-encoded, the wafer maps may be extracted as a first feature F1 having pixels 4*4*3 in the form of a total of 48 blocks. As an example, the first feature F1 may be in three-dimensional block form or may include third-order color information in two-dimensional block form.

In the method for analyzing the wafer map according to the present embodiment, the first wafer map M1 to fourth wafer map M4 corresponding to different channels, i.e., Channel 1 to Channel 4, are not auto-encoded to extract another feature F. Instead, all the wafer maps X corresponding to one wafer, that is, the first wafer map M1 to fourth wafer map M4, may be simultaneously auto-encoded, e.g., by a processor, to extract a single first feature F1. As a result, since the first wafer map M1 to fourth wafer map M4 formed in different patterns by different channels, i.e., of Channel 1 to Channel 4, are encoded to extract one first feature F1, the first feature F1 may be highly representative (accurately representative) of the wafer.

If each wafer map X is encoded to extract different features F, the characteristics of the wafer may not be accurately reflected even when each wafer map is clustered later into one or more clustered groups. As described later, features may be excluded from classified feature groups based on similarity, such that the feature groups are clustered into a clustered group during analysis. Accordingly, multi-channel auto-encoding of this example may acquire a single first feature F1 that is highly representative of the wafer.

In this way, a second feature F2, a third feature F3 and a fourth feature F4 may be extracted from different wafers, respectively. The second feature F2 to fourth feature F4 may also be extracted one by one from the multiple wafer maps X according to the different first channel (Channel 1) to fourth channel (Channel 4). These multiple features F may constitute a feature group.

The first feature F1 may be reconstructed into a reconstructed wafer map X' by the decoder. The reconstructed wafer map X' is almost the same as the wafer map X, but since information may be lost during the encoding process and reconstruction process, partial differences from the wafer map X may occur.

Specifically, the first feature F1 may be reconstructed into the first reconstructed wafer map R1 in the Channel 1, and the first feature F1 may be reconstructed into the second reconstructed wafer map R2 in the Channel 2. The first feature F1 may be reconstructed into the third reconstructed wafer map R3 in the Channel 3, and the first feature F1 may be reconstructed into the fourth reconstructed wafer map R4 in the Channel 4.

Like the first wafer map M1 to fourth wafer map M4, since the reconstructed first wafer map R1 to reconstructed fourth wafer map R4 each have 1024 units, information about the total of 4096 units may be reconstructed.

A difference between the reconstructed wafer map X' and the wafer map X may be defined as a reconstruction error. The reconstruction error may also be expressed as "Abs (X-X')", where "Abs" stands for the absolute value of the difference.

Referring again to FIG. 1, the validity is determined (S300).

As mentioned above, a feature group is a group in which features such as first feature to fourth feature (F1 to F4) are gathered. When the wafer map pattern is random in the feature group, the value of clustering performed later may be reduced. That is, the method for analyzing the wafer map according to the present embodiment visualizes characteristic portions of multiple wafer maps and utilizes the characteristic portions to analyze the characteristics of wafers later, but in the case of random patterns, it may not be helpful for such a work at all.

Therefore, the method for analyzing the wafer map according to the present embodiment removes a feature with strong random characteristics (that is, a tendency to be formed in a pattern dissimilar to other patterns), and may leave a feature with strong pattern characteristics (that is, a tendency to be formed in a pattern similar to other patterns) in the feature group.

Specifically, referring to FIGS. 2, 4 and 5, it is possible to determine the validity, using a graph according to the reconstruction error and the number of bad units.

Here, the reconstruction error may mean the aforementioned Abs (X-X'), that is, the difference between the reconstructed wafer map X' and the wafer map X. Although there is only one feature F corresponding to one wafer, since multiple wafer maps X and multiple reconstructed wafer maps X' correspond to one wafer, the aforementioned reconstruction error may be a cumulative value of a single wafer or a representative value of other methods (e.g., an average value and a median value).

Here, the number of bad units means the number of bad units C2 based on the wafer map X or the reconstructed wafer map X'. As explained in FIG. 2, when the units C1 and C2 of the wafer map are defined binarily as either of two values, i.e., as good or bad, the number of bad units C2 may be simply counted and totaled.

If the units C1 and C2 of the wafer map have several grades, a step of newly defining a good unit C1 and a bad unit C2 based on a specific reference value may be further included. Further, even when the units C1 and C2 of the wafer map have continuous values, similarly, the bad unit C2 may be defined through a step of newly defining the good unit C1 and the bad unit C2 based on a specific reference value.

Although there is only one feature F corresponding to one wafer, since multiple wafer maps X and multiple reconstructed wafer maps X' correspond to one wafer, the number of the bad units C2 may be a cumulative value of one wafer or a representative value of other methods (e.g., an average value and a median value).

In FIG. 5, when looking at the graph of the number of bad units and the reconstruction error, it is possible to empirically find a portion with strong random characteristics and a portion with strong pattern characteristics. First, a first straight line S1 connecting the origin of this graph is defined in contact with the upper contour side of the displayed numerical value. The portion with which the first straight line S1 is in contact does not necessarily need to be accurate, and the portion may have the form of a trend line.

In the same way, a third straight line S3 connecting the origin of this graph is defined in contact with the lower contour side of the displayed numerical value. The portion with which the first straight line S3 is in contact does not necessarily need to be accurate, and the portion may have the form of a trend line. When several numerical values are not entirely linearly arranged in FIG. 5, the third straight line S3 may be defined as the trend line connecting the representative values.

In addition, the first straight line S1 and the third straight line S3 do not necessarily need to be connected to the origin, but the straight lines may include one of the points close to the origin as illustrated in FIG. 5. That is, if the inclinations of the first straight line S1 and the third straight line S3 are positive, the position of the point on which the first straight line S1 and the third straight line S3 converge may not be limited.

Subsequently, a second straight line S2, which has the inclination between the first straight line S1 and the third straight line S3 and is connected to the point at which the first straight line S1 and the third straight line S3 converge, is defined. The inclination of the second straight line S2 may be closer to the inclination of the first straight line S1 than the inclination of the third straight line S3. Depending on the size of the feature to be excluded, the inclination of the second straight line S2 may be adjusted. That is, as the scale of the feature to be excluded is large, the inclination of the second straight line S2 may approach the inclination of the third straight line S3, and as the scale of the feature to be excluded is small, the inclination of the second straight line S2 may approach the inclination of the first straight line S1.

A region between the first straight line S1 and the second straight line S2 may be defined as a first region A1. The first region A1 is a region in which the reconstruction error is higher than the number of bad units, and in such a case, random characteristics of the feature F may be large. Therefore, in order that the accuracy of clustering can be maintained high, there is a need to exclude the first region in the clustering later. Therefore, the features F located in the first region A1 may be determined to be invalid.

In contrast, the second region A2 adjacent to the third straight line S3 is a region in which the reconstruction error is lower than the number of bad units, and the pattern characteristics of the feature F may be large. Therefore, the second region may be subject to clustering later, and the meaning stored in a storage device may be significant.

That is, the fourth feature F4 belonging to the first region A1 is excluded in the clustering later, and the first feature F1, the second feature F2 and the third feature F3 not belonging to the first region A1 are left and may be subject to clustering later. Therefore, the features F located in the second region A2 may be determined to be valid.

The method for analyzing the wafer map according to some embodiments of the present disclosure may also determine the validity, using a method different from FIG. 5.

Specifically, referring to FIGS. 4 and 6, the validity may be determined, using a distribution chart illustrating the reconstruction error and the number of features.

When a horizontal axis is defined as a reconstruction error and a vertical axis is defined as the number of axis features, the distribution chart as in FIG. 6 may be illustrated. Of course, the above distribution chart may have a Gaussian distribution as illustrated in FIG. 6, but it may have another form of distribution chart.

Here, the reconstruction error may mean the aforementioned Abs (X-X'), that is, the difference between the reconstructed wafer map X' and the wafer map X. Although there is only one feature F corresponding to one wafer, since multiple wafer maps X and multiple reconstructed wafer map X' correspond to one wafer, the reconstruction error may be a cumulative value of a single wafer or a representative value of other methods (e.g., an average value and a median value).

The number of features may mean the number of features F in which the numeral values of reconstruction errors are the same or similar. Therefore, it may mean a feature having a larger reconstruction error toward the right side of the horizontal axis of FIG. 6.

The reference line C1 may be a reference for defining the degree of reconstruction error of feature F to be excluded from clustering later. Depending on the reference line C1, the distribution chart of FIG. 6 may be divided into a maintenance region E1 and an exclusion region E2.

Since the feature F belonging to the maintenance region E1 has a relatively low reconstruction error, the pattern characteristics may be strong. Conversely, the features belonging to the exclusion region E2 have a relatively high reconstruction error, random characteristics may be strong. A feature F may therefore be determined valid or invalid using reconstruction errors of features.

This may be attributed to the learning method for auto-encoding. The auto-encoding is learned by the neural network to improve accuracy. As the pattern is similar, the learning amount of the neural network increases, and the reconstruction error decreases. Conversely, if there is a dissimilar pattern with the strong random characteristic, since the learning amount of the neural network is small, the reconstruction errors may increase.

Therefore, the features F located in the maintenance region E1 may be determined to be valid, and the features F located in the exclusion region E2 may be determined to be invalid.

In the method for analyzing the wafer map according to some embodiments of the present disclosure, since it is possible to exclude features with strong random characteristics through the above-described validity determination process, more accurate clustering may be performed, and as a result, the wafer map may be analyzed later, using data with no noise.

Referring again to FIG. 1, clustering is performed based on unsupervised learning (S400).

The clustering means a method for classifying data into multiple groups based on concepts such as similarity. In other words, the clustering means a method for classifying feature groups from which some features are excluded for each type based on similarity via the validity determination (S300).

Specifically, referring to FIG. 7, the clustering may be performed in dimensions formed in accordance with the number of channels. That is, in the case of two channels, the clustering may be performed in consideration of a two-dimensional distance. If there are four channels as mentioned above, the clustering may be performed in a Z space having the four dimensions. For the sake of convenience, this procedure will be described below assuming that there are two channels.

When there are two channels, namely, a first channel Ch1 and a second channel Ch2, the clustering may be performed in a two-dimensional space. The feature group includes the first feature to third feature F1 to F3, and each feature may be defined as each group based on the distance therebetween or the like.

The unsupervised learning-based clustering method may vary. As an example, the clustering algorithm of this embodiment may include at least one of KNN (K-Nearest Neighbor), K-Means, Kohenen, VQ (learning vector quantization), C-Means and t-SNE (t-Distributed Stochastic Neighbor Embedding). However, the present disclosure is not limited thereto.

Specifically, referring to FIG. 7, all the first feature F1 to third feature F3 may belong to the first group G1. Other features may also belong to the second group G2 and the third group G3 close to each other. Each of the groups G1 to G3 may each have a cluster center. While the concept of a center can be visualized for a two-dimensional or n-dimensional space, the center may itself correspond to a central value or a range of central values along an axis that defines any dimension in the n-dimensional space.

The cluster center of the first group G1 may be calculated by a distance between the first feature F1 to third feature F3, that is, the first distance D1, the second distance D2 and the third distance D3. If there are features other than the first feature F1 to third feature F3 in the first group G1, the cluster center may be calculated in consideration of the distance to the feature.

Here, the "distance" including the first distance D1 to third distance D3 means a distance in two-dimensions when there are two channels, and the distance may mean a distance in n-dimensions when there are n-channels.

The first center feature CF1 may be a feature corresponding to the cluster center. That is, there is a high possibility that the first center feature CF1 is a virtual value. That is to say, as long as there is no feature at the position of the cluster center by accident, the cluster center is a calculated value that did not exist, and thus, the first center feature CF1 may also be a virtual feature that is generated by the calculated center.

Referring again to FIG. 1, a representative image for each type, that is, for each group, is generated (S500).

Specifically, referring to FIG. 8, the first center feature CF1 may be reconstructed into the first representative image RI1. As a method for reconstruction, it is possible to use a method using a decoder of the above-described auto encoder.

Although it is not illustrated in FIG. 8, as described above, since each feature has multiple channels, the first center feature CF1 may naturally have multiple first representative images RI1 in accordance with the multiple channels.

Since there is a high possibility that the first center feature CF1 is a virtual value as described above, there is a high possibility that the first representative image RI1 is also a virtual image. However, in the case of the first center feature CF1, since the first group G1 is highly (accurately) represented and the error occurring when the first center feature CF1 is decoded is small, the possibility of formation of noise in the first representative image RI1 may be minimized.

If both the first feature F1 to third feature F3 are reconstructed and the first wafer map R1 to third reconstructed wafer map R3 are captured or generated in order to form a representative image of the first group G1, and the reconstructed first wafer map R1 to reconstructed third reconstructed wafer map R3 are combined by any method, the representative image may lose the representativeness of the first group G1, while the noises formed in the decoding process over three times re superimposed. As a result, the accuracy of analysis of the wafer map according to the representative images may be lowered later.

Therefore, the method for analyzing the wafer map according to the present embodiment may minimize noise, using a method for extracting a representative image by the use of a virtual center value, and may obtain cluster data close to actual data.

Referring again to FIG. 1, code is assigned to each representative image and stored therein (S600).

Specifically, referring to FIG. 9, the first representative image RI1 is specified as a first code (Code 1). The second representative image (RI2) may be specified as a second code (Code 2). The third representative image RI3 may be specified as a third code (Code 3).

The code may allow a representative image to be searched by calling a representative image in the storage device and using an indexing function later. In addition, characteristics of each representative image may be stored together depending on the code, and problems of process and facility can be easily traced in the case of being similar to a specific code. Thus, the code can be used to isolate a source for manufactured semiconductors later, such as when a defect is detected or being investigated.

In addition, when the representative image to be generated later is similar to the coded representative image, it is possible to easily perform clustering of the representative images by assigning similar or identical codes.

In the method for analyzing the wafer map according to some embodiments of the present disclosure, by, e.g., a processor, simultaneously auto-encoding multiple wafer maps to extract one feature, it is possible to obtain a feature that is highly representative based on the correlation between the respective parameters.

Also, a precise work can be executed based on one feature in the validity determination or clustering later.

Through the work of validity determination, by excluding features with low pattern characteristics, that is, features with high random characteristics, clustering efficiency may be improved, and the significance of data may be improved.

Furthermore, the method for analyzing the wafer map according to the present embodiment reconstructs the central features corresponding to the cluster center, and derives them as representative images to minimize noise due to reconstruction. The method results in generating representative images that are highly representative of clustering.

Hereinafter, referring to FIG. 10, another method for analyzing a wafer map according to some embodiments of the present disclosure will be described. The repeated part of the above explanation will be omitted or simplified.

Figure 10:
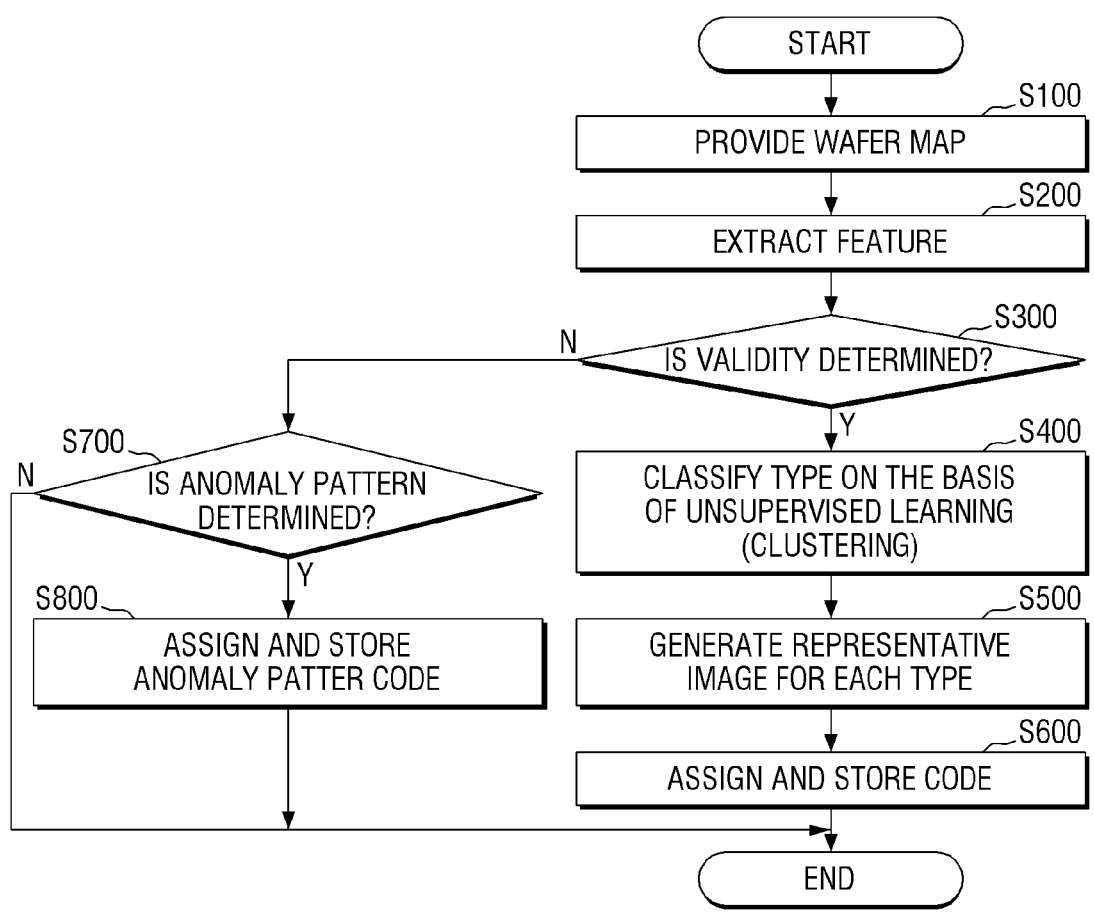
FIG. 10 is a flowchart illustrating another method for analyzing the wafer map according to some embodiments of the present disclosure.

FIG. 10 is a flowchart illustrating another method for analyzing the wafer map according to some embodiments of the present disclosure.

Referring to FIG. 10, the method for analyzing the wafer map according to the present embodiment may further include a step (S700) of anomaly pattern determination, and a step (S800) of anomaly pattern encoding and storing as compared with the embodiment of FIG. 1. Therefore, the steps of S700 and S800 will be mainly described below.

The validity is determined (S300), and it is determined whether the feature determined to be invalid is an anomaly pattern (S700).

The anomaly pattern may mean an anomaly pattern that is rare or that does not exist in existing learning data. That is, the anomaly pattern may mean a pattern with very little similarity with an anomaly pattern sample stored in advance. Since the anomaly pattern is likely to be caused by serious defects in the manufacturing facility of the semiconductor device, it is necessary to separately detect and store the anomaly pattern. The anomaly pattern may mean a pattern that has strong random characteristics but can intuitively and clearly reflects the cause. For example, if a half of the wafer is a bad unit or the peripheral portions of the wafer are all bad units, the user may intuitively trace the problems of the facility or the process.

There may be various ways to determine the anomaly pattern. For example, the method for determining the anomaly pattern may include comparison of the pre-stored pattern with the current feature.

By comparing the pre-stored pattern sample with the current feature, in a case where the numerical value of the similarity is low, the pattern may be determined as the anomaly pattern. If the numerical value of similarity is high, it is possible to determine that the current feature is not an anomaly pattern.

If the current feature is an anomaly pattern, a code may be assigned to the anomaly pattern and stored therein (S800).

In the case of the anomaly pattern, the code may be assigned and stored in the feature itself. Alternatively, after the features are decoded by the auto encoder and visualized by the reconstructed wafer map, the code may be assigned thereto and stored.

The code may allow the anomaly pattern images to be searched, by calling the representative image in the storage device, and using an indexing function later. Further, by storing the characteristics of each anomaly pattern image together depending on the code, it is possible to easily trace the problems of process and facility when they are similar to a specific code.

Hereinafter, a wafer map analyzer according to some embodiments of the present disclosure will be described with reference to FIGS. 4 to 9, 11, and 12. The repeated parts of the above description will be omitted or simplified.

Figure 11:
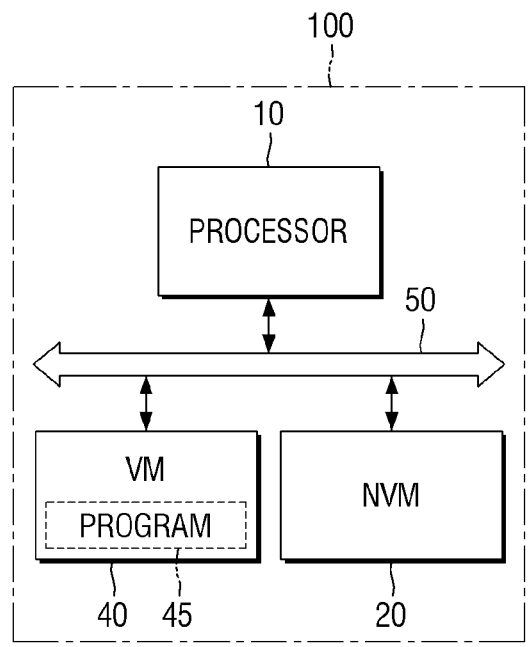
FIG. 11 is a block diagram illustrating a wafer map analyzer according to some embodiments of the present disclosure.
Figure 12:
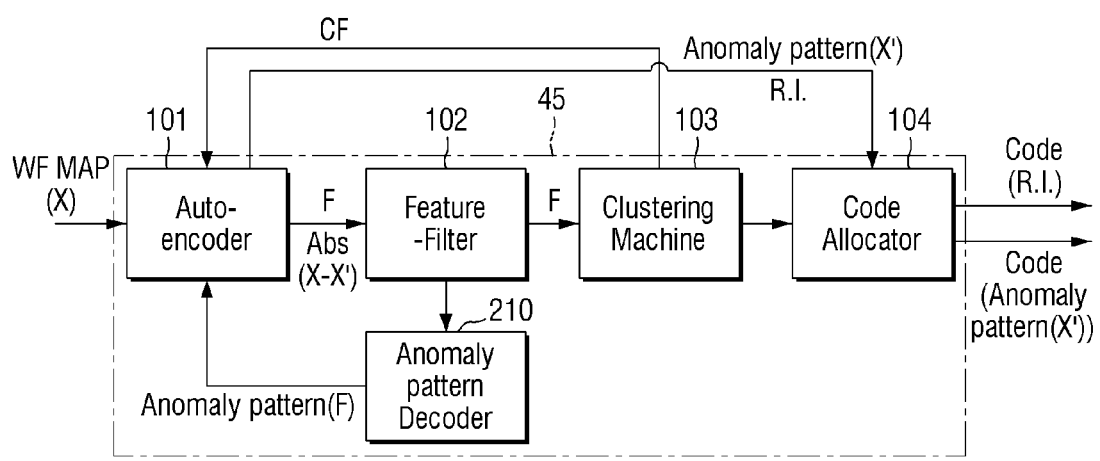
FIG. 12 is a block diagram illustrating the operation of the wafer map analyzer according to some embodiments of the present disclosure in detail.

FIG. 11 is a block diagram illustrating a wafer map analyzer according to some embodiments of the present disclosure, and FIG. 12 is a block diagram illustrating the operation of the wafer map analyzer according to some embodiments of the present disclosure in detail.

Referring to FIGS. 4 to 9, 11 and 12, a wafer map analyzer 100 according to some embodiments of the present disclosure includes a processor 10, a non-volatile memory 20, a volatile memory 40, and a bus 50.

The processor 10 may be a processor of a neural network. The neural network means a network provided by modelling the structure of the human brain, which is made up of a number of artificial neurons, and in which the respective neurons are connected to one another by connection strength and weight. Therefore, the neural network processor should have excellent ability in the parallel distributed processing, computing ability, and learning. The neural network processor may also be suitable for controlling complicated non-linear systems, and may provide an output to the unsupervised learning.

The non-volatile memory 20 may receive the transmission of the wafer map X and store the wafer map X therein. The wafer map X may be processed to other data by the processors 10 later. The non-volatile memory 20 may store the program 45 therein.

The volatile memory 40 may be utilized as a temporary memory for the operation of the processor 10. Program 45 may be loaded into the volatile memory 40. The program 45 may be loaded into the volatile memory 40 by the instruction of the processor 10 in the state of being stored in the non-volatile memory 20.

The bus 50 may mutually connect the processor 10, the non-volatile memory 20, and the volatile memory 40. That is, all the movement of data and request may be performed through the bus 50.

The processor 10 may perform the program 45 loaded to the volatile memory 40. The program 45 includes sequential operations.

Referring to FIGS. 4 to 9 and 12, the program 45 includes an auto encoder 101, a feature filter 102, an anomaly pattern detector 210, a clustering machine 103, and a code allocator 104.

The program 45 is performed by the processor 10, and each of the auto encoder 101, the feature filter 102, the anomaly pattern detector 210, the clustering machine 103 and the code allocator 104 may process data by the processor 10.

The auto encoder 101 may receive the input of the wafer map X to extract the feature F. The auto encoder 101 may perform auto-encoding of multiple wafer maps X using multiple channels, i.e., Channel 1 to Channel 4, at the same time to extract them as a single feature F. The first feature F1 may be reconstructed as the reconstructed wafer map X' by the auto encoder 101. The auto encoder 101 may derive a reconstruction error (Abs (X-X')) which is a difference between the reconstructed wafer map X' and the wafer map X.

The feature filter 102 may determine the validity of the feature F to exclude invalid features F from the overall feature group, while leaving only the valid feature F. The feature filter 102 may perform filtering, using the reconstruction error and the bad unit number, (FIG. 5), or may perform filtering, using distribution of features due to reconstruction error (FIG. 6). However, the present disclosure is not limited thereto.

The anomaly pattern detector 210 may determine whether the feature F determined to be an invalid feature F by the feature filter 102 is an anomaly pattern.

The anomaly pattern may mean a pattern that is rare or that does not exist in the existing learning data. That is, the anomaly pattern may mean a pattern with very little similarity with a pre-stored pattern. Since the anomaly pattern is likely to be caused by serious defects in the manufacturing facility of the semiconductor device, it is necessary to separately detect and store the anomaly pattern. Therefore, the anomaly pattern detector 210 may detect the anomaly pattern and may transmit it to the auto encoder 101.

The clustering machine 103 may cluster the valid feature F passing through the feature filter 102. The clustering machine 103 may perform clustering in a Z space having a dimension corresponding to the number of channels.

When multiple groups (G1 to G3) is determined in accordance with the clustering, the clustering machine 103 may generate a center feature CF corresponding to the center of each group. The clustering machine 103 may transmit the center feature CF to the auto encoder 101.

The auto encoder 101 may reconstruct the center feature CF via the decoding function to generate a representative image (R.I.). The auto encoder 101 may transmit the representative image (R.I.) to the code allocator 104.

Further, the auto encoder 101 may reconstruct an anomaly pattern via the decode function to generate a reconstructed wafer map anomaly pattern X'. The auto encoder 101 may transmit the reconstructed wafer map anomaly pattern X' to the code allocator 104.

The code allocator 104 may assign each code to the representative image (R.I.). The code allocator 104 may also allocate a code to the reconstructed wafer map anomaly pattern X'.

The code means the name of the representative image (R.I.) or the anomaly pattern stored in the non-volatile memory 20, and allows retrieval of the representative image (R.I.) and the anomaly pattern, using an indexing function later. Further, by storing characteristics of each representative image or the anomaly patterns together depending on the code, when a wafer map similar to the representative image (R.I.) or the anomaly pattern corresponding to a specific code is detected, it is possible to easily trace the problems of the process and the facility.

The code allocator 104 may store the anomaly pattern and the code in the non-volatile memory 20.

Hereinafter, a method for manufacturing a semiconductor device according to some embodiments of the present disclosure will be described with reference to FIGS. 2, 3, 9, 13, and 14. The repeated parts of the above explanation will be omitted or simplified.

Figure 13:
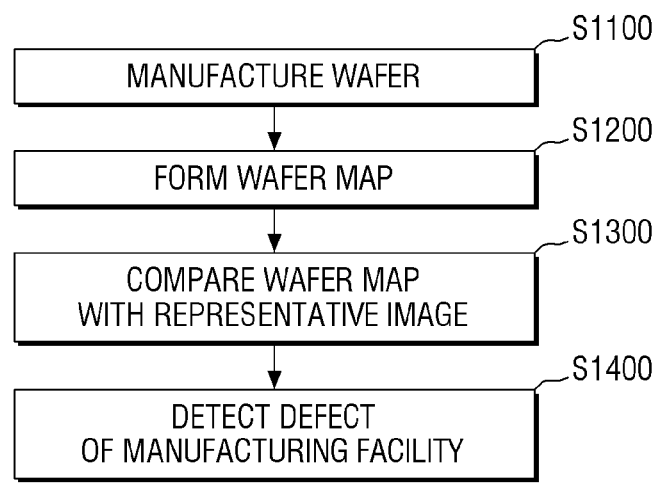
FIG. 13 is a flowchart illustrating a method for manufacturing a semiconductor device according to some embodiments of the present disclosure.
Figure 14:
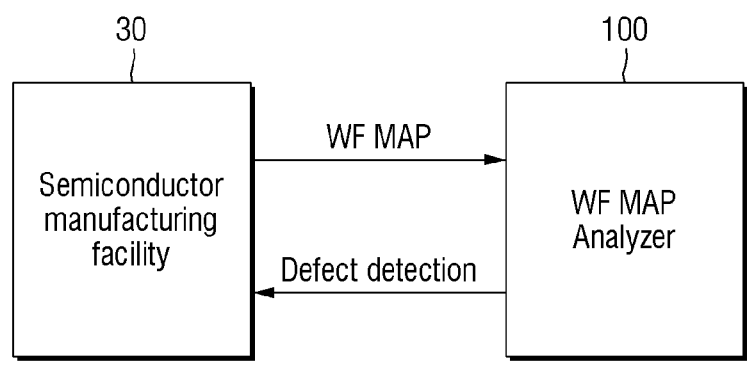
FIG. 14 is a block diagram illustrating a method for manufacturing the semiconductor device according to some embodiments of the present disclosure.

FIG. 13 is a flow chart illustrating a method for manufacturing a semiconductor device according to some embodiments of the present disclosure, and FIG. 14 is a block diagram illustrating a method for manufacturing the semiconductor device according to some embodiments of the present disclosure.

Referring to FIG. 13, a wafer is manufactured (S1100).

Wafer W means a silicon substrate used in the process of manufacturing the semiconductor device. A semiconductor device such as a transistor is formed on the surface of the wafer W, and may be diced and separated into multiple chips later.

Several patterns such as transistors and diodes may be formed on the surface of the wafer, through multiple semiconductor manufacturing processes. The semiconductor manufacturing process may include various processes such as a vapor deposition process, an etching process, a plasma process, and an implant process.

Specifically, referring to FIG. 13, the semiconductor manufacturing facility 30 may manufacture a semiconductor device, that is, a wafer therein. The semiconductor manufacturing facility 30 is a semiconductor fabrication facility, in which the wafer is fabricated.

Subsequently, a wafer map is formed (S1200).

Specifically, referring to FIGS. 2 and 3, the wafer map X may be an image mapped by displaying the goodness and badness for each of the units C1 and C2 in a plan view of the wafer W. Multiple wafer maps X may be captured or generated in a single wafer. That is, different wafer maps X may be captured or generated in accordance with the respective channels, i.e., of Channel 1 to Channel 4. Specifically, a first wafer map M1 may be captured or generated in the Channel 1, and a second wafer map M2 may be captured or generated in the Channel 2. A third wafer map M3 may be captured or generated in the Channel 3, and a fourth wafer map M4 may be captured or generated in the Channel 4.

Referring to FIG. 14, the semiconductor manufacturing facility 30 may transmit the wafer map acquired through the wafer to the wafer map analyzer 100.

Referring again to FIG. 13, the wafer map X is compared with the representative image (S1300).

Referring to FIG. 9, the wafer map X may be compared with the first representative image (RI1) to third representative image (RI3) stored in advance. Since the first representative image (RI1) to third representative image (RI3) stored in advance are the wafer maps reconstructed in the auto-encoded feature, the first representative image (RI1) to third representative image (RI3) may be immediately compared with the wafer map X. Also, since there are multiple representative images, i.e., first representative image (RI1) to third representative image (RI3), in accordance with each channel, it is possible to compare the wafer map X of the same channel with the first representative image (RI1) to third representative image (RI3).

Referring to FIG. 14, the wafer map analyzer 100 may compare the wafer map X with the representative image. The first representative image (RI1) to third representative image (RI3) may have previously assigned codes. Therefore, the wafer map X may be compared with a code having the representative image most similar to the wafer map X among multiple codes.

The characteristics of the code and the representative image to which the code is assigned are stored together, and it is possible to easily trace how a part of the facility or process acts accordingly.

Subsequently, the defects of the manufacturing facility are detected (S1400).

Specifically, referring to FIG. 14, the wafer map analyzer 100 may detect the defects in the semiconductor manufacturing facility 30. Alternatively, the wafer map analyzer 100 may detect the defects in the semiconductor manufacturing process.

In other words, in the representative image assigned with the code, it is possible to investigate which type of process defect exists in the wafer formed as such a representative image, and when there is a problem in some parts of the manufacturing facility, whether the representative image is formed.

As a result, in the case of a wafer having a wafer map X similar to the representative image, it is possible to easily trace defects on the previously investigated process or facility. Thus, the method for manufacturing a semiconductor device according to some embodiments of the present disclosure can precisely complement the problems in the process and facility.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method for analyzing a wafer map of a semiconductor wafer, the method comprising:
    generating first wafer maps each displaying characteristics of a corresponding first wafer for each of a plurality of channels;
    auto-encoding the first wafer maps simultaneously to extract a single first feature of the semiconductor wafer;
    determining whether the first feature is a valid pattern for classification;
    classifying a type of the first feature based on unsupervised learning when the first feature is a valid pattern by clustering into a clustered group a plurality of feature groups including the first feature; and
    extracting a representative image of features classified into the same type as the first feature by generating a feature of a cluster center of the clustered group and reconstructing the feature to extract the representative image,
    wherein each of the plurality of channels of the first wafer is determined by different parameters that differ from each other, and
    wherein each of the first wafer maps of the first wafer is generated with different patterns.

2. The method of claim 1, wherein determining whether the first feature is the valid pattern comprises:
    reconstructing the first feature to generate a first reconstructed wafer map;
    deriving a reconstruction error, using the first reconstructed wafer map and the first wafer map; and
    determining whether the first feature is the valid pattern, using the reconstruction error.

3. The method of claim 2, wherein the first wafer map comprises a plurality of units having good values or bad values, and
    determining whether the first feature is the valid pattern includes considering the reconstruction error and a number of units having the bad values.

4. The method of claim 2, wherein determining whether the first feature is the valid pattern comprises:
    determining whether the first feature is a feature having a high reconstruction error among a plurality of feature groups including the first feature.

5. The method of claim 1, further comprising:
    designating a code of the representative image and storing the code in a storage device.

6. The method of claim 1, further comprising:
    determining whether the first feature is an anomaly pattern when the first feature is not a valid pattern.

7. The method of claim 6, wherein determining whether the first feature is an anomaly pattern comprises:
    comparing an anomaly pattern sample stored in advance with the first feature.

* * * * *